US012535377B2

(12) United States Patent
Langdale

(10) Patent No.: US 12,535,377 B2
(45) Date of Patent: Jan. 27, 2026

(54) LEAK DETECTION

(71) Applicant: SYNOVATE LIMITED, Harrogate (GB)

(72) Inventor: Simon John Langdale, Leeds (GB)

(73) Assignee: SYNOVATE LIMITED, Harrogate (GB)

(*) Notice: Subject to any disclaimer, the term of this patent is extended or adjusted under 35 U.S.C. 154(b) by 412 days.

(21) Appl. No.: 18/252,646

(22) PCT Filed: Nov. 11, 2021

(86) PCT No.: PCT/GB2021/052916
§ 371 (c)(1),
(2) Date: May 11, 2023

(87) PCT Pub. No.: WO2022/101628
PCT Pub. Date: May 19, 2022

(65) Prior Publication Data
US 2024/0003771 A1 Jan. 4, 2024

(30) Foreign Application Priority Data
Nov. 12, 2020 (GB) .................................... 2017856

(51) Int. Cl.
G06T 7/136 (2017.01)
G01M 3/00 (2006.01)
(Continued)

(52) U.S. Cl.
CPC .......... *G01M 3/002* (2013.01); *G01M 3/2815* (2013.01); *G01M 3/38* (2013.01);
(Continued)

(58) Field of Classification Search
CPC ...... G01M 3/002; G01M 3/047; G01M 3/005; G01M 3/38; G01M 3/2823; G06T 7/001;
(Continued)

(56) References Cited

U.S. PATENT DOCUMENTS 5,742,053 A * 4/1998 Rekunyk ................ G01V 9/007
250/338.5
10,234,354 B2 * 3/2019 Badawy .................. G01M 3/38
(Continued)

FOREIGN PATENT DOCUMENTS

| CN | 107992857 A | 5/2018 | |
| JP | S62211537 A | 9/1987 | |
| KR | 102097371 B1 * | 5/2020 | ................ G01J 5/00 |

OTHER PUBLICATIONS

Computer translation of CN-107992857 (Year: 2025).*
(Continued)

*Primary Examiner* — Randy W Gibson
(74) *Attorney, Agent, or Firm* — Alston & Bird LLP

(57) ABSTRACT

The present application describes a method of determining a leak location in a pipeline, comprising processing captured image data associated with at least one image captured from within a pipeline to identify a change in temperature of an interior surface of the pipeline responsive to a change in temperature of a fluid leaking from the pipeline to determine a leak location in the pipeline. A system and apparatus for determining a leak location in a pipeline are also described.

18 Claims, 4 Drawing Sheets

(51) Int. Cl.
  *G01M 3/28* (2006.01)
  *G01M 3/38* (2006.01)
  *G06T 7/00* (2017.01)
(52) U.S. Cl.
  CPC .............. *G06T 7/001* (2013.01); *G06T 7/136* (2017.01); *G06T 2207/10004* (2013.01)
(58) Field of Classification Search
  CPC .......... G06T 7/136; G06T 2207/10004; G03B 37/005
  See application file for complete search history.

(56) References Cited

U.S. PATENT DOCUMENTS

| | | |
|---|---|---|
| 10,718,683 B2 | 7/2020 | Chiu |
| 2015/0317787 A1* | 11/2015 | Badawy ................... G06T 7/90 382/152 |

OTHER PUBLICATIONS

Computer translation of KR-102097371 (Year: 2025).*
Computer translation of JP 62-211537 (Year: 2025).*
Great Britain Search Report for Application No. GB2017856.2, dated Jul. 16, 2021, (1 page), United Kingdom Intellectual Property Office, South Wales, United Kingdom.
Great Britain Search Report for Application No. GB2116220.1, dated Apr. 26, 2022, (7 pages), United Kingdom Intellectual Property Office, South Wales, United Kingdom.
International Search Report and Written Opinion for PCT Application No. PCT/GB2021/052916, dated Feb. 3, 2022, (11 pages), European Patent Office, Rijswijk, Netherlands.

* cited by examiner

LEAK DETECTION

CROSS REFERENCE TO RELATED APPLICATIONS

This application is a National Stage Application, filed under 35 U.S.C. § 371, of International Application No. PCT/GB2021/052916, filed Nov. 11, 2021, which international application claims priority to and the benefit of United Kingdom Application No. 2017856.2, filed Nov. 12, 2020; the contents of both of which are hereby incorporated by reference in their entirety.

BACKGROUND

Related Field

The present invention relates to detecting leaks in pipes and in particular, but not exclusively, to a method and apparatus for non-destructive, in-pipe detection of a fluid, such as a gas, leaking from a pipe.

Description of Related Art

Pipelines conveying a fluid, such as a gas, are known to leak from joints connecting sections of the pipeline together, from fittings located along the pipeline, and from cracks resulting from internal and/or external corrosion, pin holes or fracture to the pipeline wall, as well as third party damage. Conventional external leak detection methods rely on the leak being seen above ground, hopefully where the leak is located. Obstructive ground layers above the pipe can cause leaking gases to track under them leading to inaccurate leak location and unnecessary excavations and repair of pipe section which is otherwise structurally sound.

Known in-pipe leak detection systems include closed-circuit television (CCTV) systems which can help to visualise the pipeline and highlight joints, connections, fittings and leak indicators such as cracks, water ingress and poor joints or the like. However, CCTV-based systems cannot confirm a leak and its exact location. Acoustic leak detection systems are also known but these systems are often limited by 'background' noise, vibrations from traffic above ground, the in-pipe pressure and the local environment.

BRIEF SUMMARY

It is an aim of certain embodiments of the present invention to provide a method and apparatus for detecting a leak of a fluid flowing along a pipe and in particular detecting the exact location of the leak from inside the pipe by utilising the fluid flowing through the pipe.

It is an aim of certain embodiments of the present invention to provide a method and apparatus for detecting a leak from inside a pipe without having to shut off the flow of fluid being conveyed through the pipe.

According to a first aspect of the present invention there is provided a method of determining a leak location in a pipeline, comprising:

processing captured image data associated with at least one image captured from within a pipeline to identify a change in temperature of an interior surface of the pipeline responsive to a change in temperature of a fluid leaking from the pipeline to determine a leak location in the pipeline.

Optionally, the method comprises:

capturing the at least one image at a first location along the pipeline; and comparing the captured image data with reference image data associated with a corresponding reference image obtained at a location within the pipeline substantially corresponding to the first location.

Optionally, the method comprises comparing at least one pixel of the captured image with at least one corresponding pixel of the reference image to identify the change in temperature of the interior surface of the pipeline proximal to the leak location.

Optionally, the method comprises comparing pixel intensity/brightness and/or contrast distribution associated with corresponding pixels of the captured image and the reference image.

Optionally, the method comprises categorising the reference image data of a plurality of reference images obtained at different locations along the pipeline based on pixel intensity/brightness variation.

Optionally, the method comprises creating contrast thresholds based on pixel contrast distributions for a plurality of reference images obtained at different locations along the pipeline, and applying a contrast filter based on the contrast thresholds to the captured image data of the corresponding captured images.

Optionally, the temperature of the interior surface of the pipeline proximal to the leak location is less than the temperature of a main body of fluid flowing along the pipeline and/or the temperature of the interior surface of the pipeline distal to the leak location.

Optionally, the temperature of the interior surface of the pipeline proximal to the leak location is greater than the temperature of a main body of fluid flowing along the pipeline and/or the temperature of the interior surface of the pipeline distal to the leak location.

Optionally, a temperature of the leaking fluid increases at the leak location responsive to an increase in volume of the leaking fluid to thereby increase the temperature of the interior surface of the pipeline proximal to the leak location.

Optionally, the method comprises actively heating a portion of the fluid flowing along the pipeline.

Optionally, the method comprises actively heating a portion of the fluid flowing upstream or downstream of the leak location.

Optionally, the method comprises determining a rate of change of temperature of the interior surface of the pipeline proximal to the leak location.

Optionally, the method comprises determining a leakage flow rate at the leak location based on the rate of change of temperature and one or more of the following data: bulk fluid temperature, bulk fluid flow rate, bulk fluid pressure, surface temperature, surface lag/phase response, rate of surface temperature increase, rate of surface temperature cooling, pipeline material thermal properties, leak location and leak geometry/size.

Optionally, the method comprises intermittently actively heating a portion of the fluid flowing along the pipeline and capturing said image data and one or more of the additional data during heating and cooling of the interior surface of the pipeline proximal to the leak location.

Optionally, the method comprises blowing at least a portion of the actively heated fluid along the pipeline or radially outwardly with respect to a longitudinal axis of the pipeline.

Optionally, the method comprises heating said portion of fluid by at least one heating element of apparatus located in the pipeline.

Optionally, the method comprises controllably moving apparatus along the pipeline, wherein the apparatus comprises a device for capturing and obtaining said images.

Optionally, the device comprises an infrared camera.

According to a second aspect of the present invention there is provided a system for determining a leak location in a pipeline, comprising:
- apparatus for locating in a pipeline and comprising a device for capturing images of an interior surface of the pipeline; and
- a controller configured to process captured image data associated with at least one image captured from within the pipeline to identify a change in temperature of the interior surface of the pipeline responsive to a change in temperature of a fluid leaking from the pipeline to determine a leak location in the pipeline.

Optionally, the device comprises an infrared camera.

Optionally, the apparatus comprises a heater for heating a portion of the fluid flowing along the pipeline.

Optionally, the apparatus comprises a heater for heating a portion of the fluid flowing upstream or downstream of the leak location.

Optionally, the apparatus comprises a blower for blowing the portion of the fluid along the pipeline or radially outwardly with respect to a longitudinal axis of the pipeline.

Optionally, the apparatus comprises at least one sensor for sensing bulk fluid temperature, bulk fluid flow rate, bulk fluid pressure, or axial location of the apparatus in the pipeline.

According to a third aspect of the present invention there is provided apparatus for determining a leak location in a pipeline, comprising:
- a body for controllably moving along an interior of a pipeline;
- an image capturing device mounted to the body for capturing images of an interior surface of the pipeline; and
- a heater for actively heating a portion of fluid flowing along the pipeline.

Optionally, the apparatus comprises a blower for blowing a portion of the fluid along the pipeline or radially outwardly with respect to a longitudinal axis of the pipeline.

Optionally, the blower is configured to blow the portion of fluid over a heating element of the heater.

Optionally, the body is supported on a plurality of surface engaging elements each engageable with the pipeline.

Optionally, each of the plurality of surface engaging elements is selectively driveable to move the apparatus along the pipeline.

Optionally, the image capturing device is selectively moveable between a retracted position and a deployed position with respect to the body.

Optionally, the apparatus comprises a controller configured to process captured image data associated with at least one image captured from within the pipeline to identify a change in temperature of the interior surface of the pipeline responsive to a change in temperature of a fluid leaking from the pipeline to determine a leak location in the pipeline.

According to a fourth aspect of the present invention there is provided use of apparatus according to the third aspect of the present invention for determining a leak location in a pipeline.

BRIEF DESCRIPTION OF THE FIGURES

Certain embodiments of the present invention will now be described with reference to the accompanying drawings in which.

DETAILED DESCRIPTION OF VARIOUS EMBODIMENTS

Figure 1A:
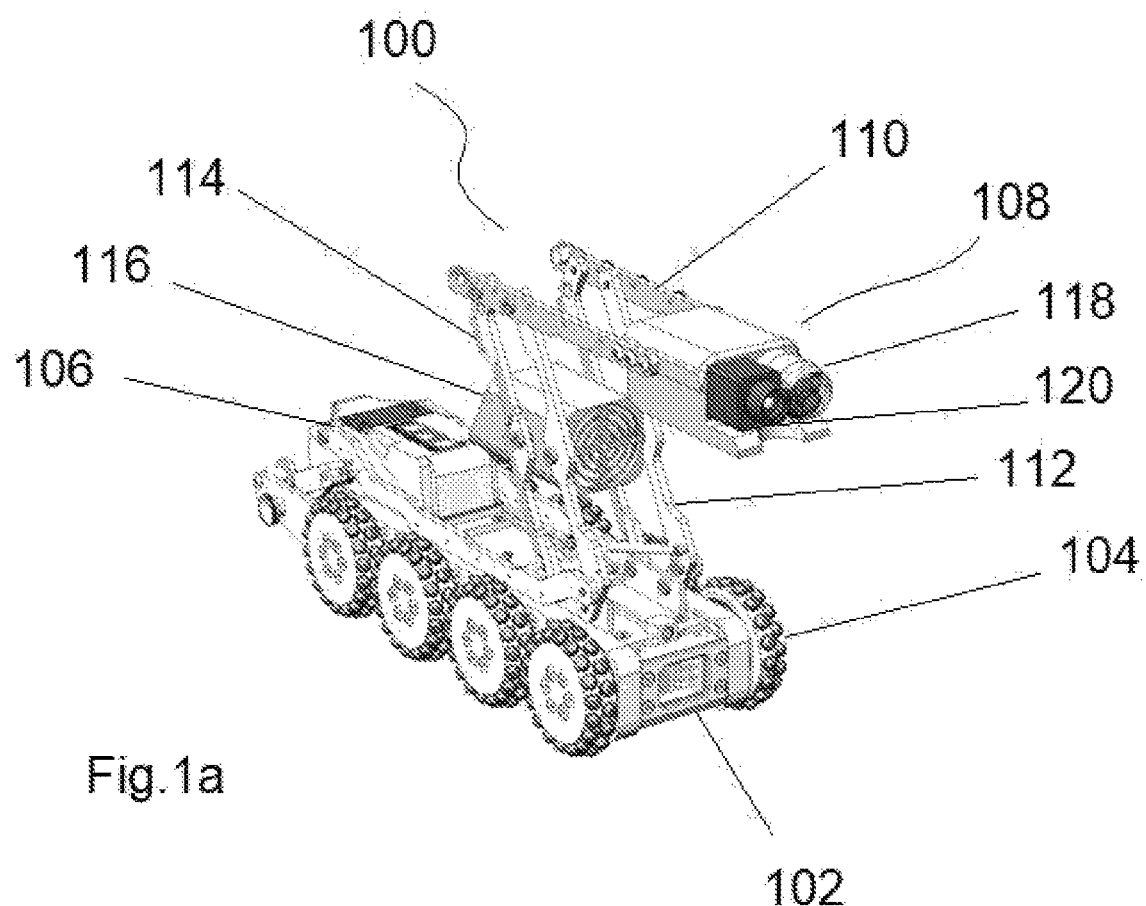
FIG. 1a illustrates apparatus according to certain embodiments of the present invention wherein an arm of the apparatus supporting an image capturing device is in a deployed state.
Figure 1B:
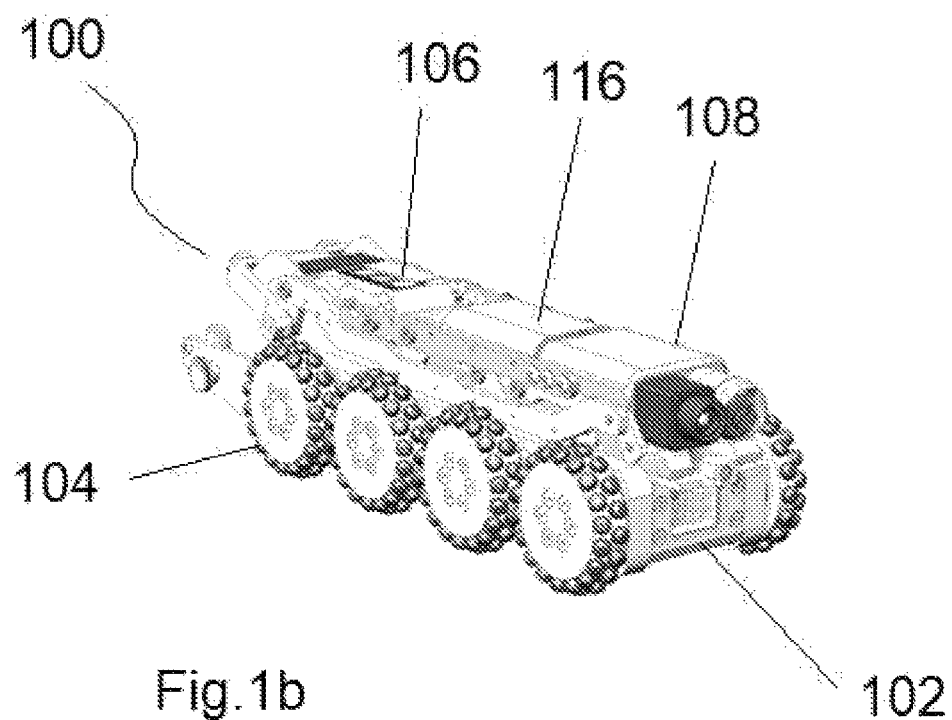
FIG. 1b illustrates the apparatus of FIG. 1a wherein the arm of the apparatus is in a retracted state.

As illustrated in FIGS. 1a and 1b, apparatus 100 according to certain embodiments of the present invention includes a chassis 102 supported on a plurality of wheels 104 selectively driven in either direction by an electric motor coupled to the wheels by a gear assembly. Alternatively, the apparatus may comprise a plurality of tracks, or the like, and/or the apparatus may be manually or automatically pushed along a pipeline by a pushrod arrangement coupled to the apparatus and terminating above ground. Aptly, all of the wheels are coupled to, and selectively driven by, the electric motor. The motor is coupled to an onboard controller 106 configured to communicate either wirelessly or by a wired connection with an on-surface controller operable by an authorised user to selectively control the apparatus from above ground. The on-surface controller is aptly a computing device including a user interface and display, such as a tablet or the like. An infrared (IR) camera module 108 is mounted to an end region of a first pair of spaced apart and parallel support arms 110 which are each pivotally coupled at the other end region to a respective end region of a second pair of spaced apart and parallel arms 112 and a third pair of spaced apart and parallel arms 114 which are each pivotally coupled at their other end regions to the chassis 102. The first pair of arms 110 is linked to the second and third pairs of arms 112,114 such that the second and third pairs of arms rotate together and each of the first pair of arms 110 remains parallel with the chassis 102. The second and/or third pair of arms 112,114 is selectively rotated by a motor to raise or lower the first pair of arms 110, and in turn the IR camera module 108, with respect to the chassis. FIG. 1a illustrates the camera module 108 in a deployed/raised position and FIG. 1b illustrates the camera module 108 in a retracted/lowered position. Aptly, the camera module 108 can be moved to any position between the retracted and deployed positions. Furthermore, the camera module 108 may be selectively rotatable about a vertical and/or horizontal axis with respect to the first pair of support arms 110 and/or the second and third pairs of arms 112,114 may be selectively rotatable about a vertical axis, e.g. by being mounted to a turntable rotatable with respect to the chassis. Such an arrangement may desirably allow the camera module to be selectively moved to a position and orientation which allows for optimal image capture of a specific pipe feature.

A heater and blower unit 116 is pivotally mounted approximately midway along and between the second and third pair of arms 112,114 to move up or down with the IR camera module 108 relative to the chassis 102 whilst remaining substantially horizontal and parallel with respect to the chassis. The heater and blower unit 116 is coupled to the onboard controller 106 to allow the same to be selectively turned on/off when required, as described further below.

The IR camera module 108 includes an IR illuminating device 118, such as an array of IR LEDs, and a camera 120 for capturing still and/or moving images (video) of the pipe wall and features/fittings thereof. The camera module 108 is coupled to the onboard controller 106 for storing image data locally and/or for sending image data to the on-surface controller for storage and/or processing.

Figure 2:
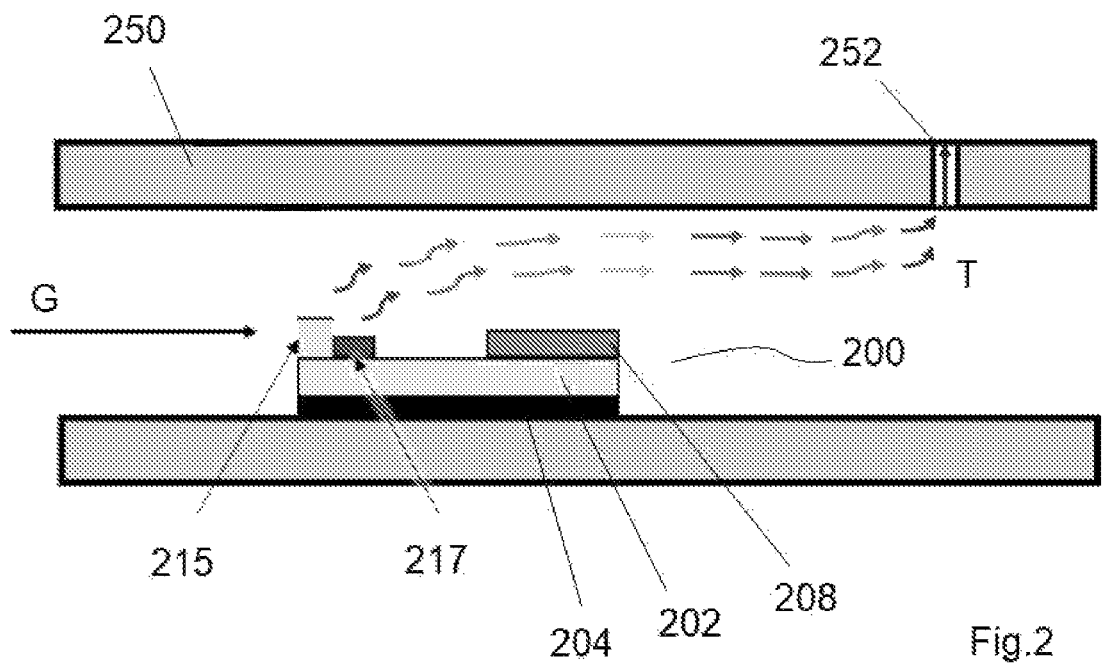
FIG. 2 illustrates a schematic of the apparatus of FIGS. 1a and 1b in a pipeline.

As schematically illustrated in FIG. 2, apparatus 200 according to an alternative embodiment of the present invention is located inside a pipe 250 and driven along the pipe in the direction of a gas (arrow G) flowing through the pipe. The apparatus 200 includes a body 202 supported on wheels or tracks 204, an IR camera module 208 mounted on the front end region of the body and a blower 215 and a heater 217 mounted on the rear end region of the body. The blower 215 blows some of the gas flowing through the pipe over a heating element of the heater 217 to increase the temperature of the gas. Alternatively, an acoustic device may be provided to locally excite the gas by way of vibrations and in turn increase the temperature of the gas. The heated gas T is either mixed with the remaining pipeline gas or accelerated radially outwardly by the blower towards the pipe wall. Alternatively, the blower may not be required and the heated gas passing over the heater may be drawn outwardly towards the leak in view of the pressure difference across the leak point (such as a joint or crack) 252. The heated gas acts as a 'tracer' or 'smoke stream' which can be detected and compared against the remaining cooler gas flowing through the pipe and/or a temperature of the pipe surface, as described further below. Leaking heated gas transfers heat to the pipe or feature and this relative warming is detected by the on-board thermal imaging camera. Additional sensor data, such as gas temperatures, flow rates, pipe materials etc., are optionally captured and used to correlate the observed temperature change of the pipe wall or feature to a leakage flow rate.

Figure 3:
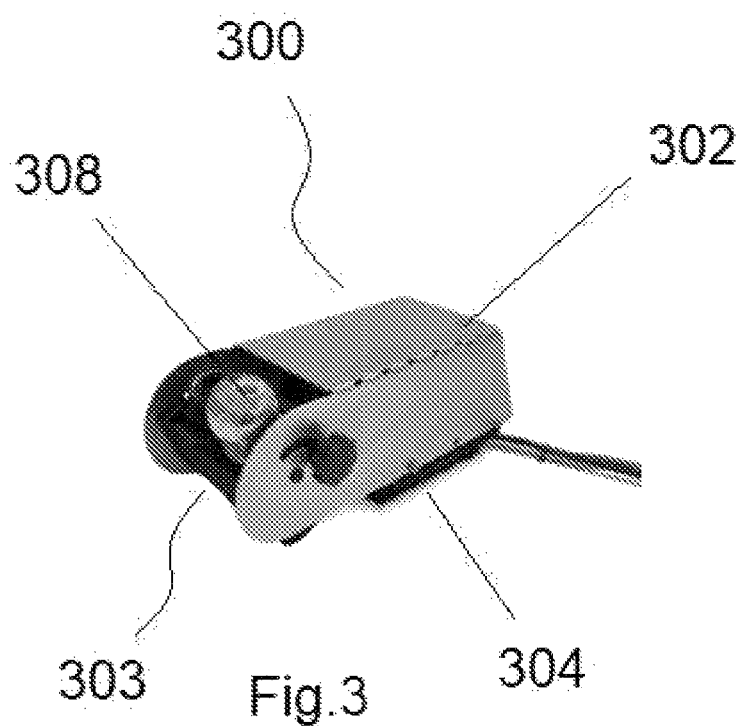
FIG. 3 illustrates a further embodiment of the apparatus.

Apparatus 300 according to an alternative embodiment of the present invention is illustrated in FIG. 3. The apparatus 300 includes a body 302 mounted on a pair of driven tracks or wheels 304. The body 302 is substantially rectangular and hollow box section having an open front end region 303. An IR camera module 308 is located in the open front end region and is selectively rotatable about at least the horizontal axis. The rear end region of the body is open or may include a grill or slots. A blower and heater (not shown) is located in the rear end region of the body and configured to blow air rearwardly against the flow of gas in the pipe to thereby cause turbulence and mix the heated and unheated gas flows. Alternatively, the heater element/s may be located in the body 'upstream' of the blower such that gas is blown over the heater element/s. The excited gas stream is thereby warmed such that it can be used as a 'tracer' or 'smoke stream' which can be detected and compared against the remaining cooler gas flowing through the pipe and/or a temperature of the pipe surface, as described further below. The thermal camera optics can be selected to either view the heated gas stream directly or to only be able to see the heated surfaces of the leaking pipe where the heated/mixed gas comes into significant contact. This is accomplished by tuning/adjusting the thermal camera filters to only see certain wavelengths of IR radiation based on the emission spectrum of the pipeline gas. This makes the gas appear either translucent or clear in the images with respect to the unheated/heated gas.

In use, reference images of the inside of a pipeline are initially captured by the IR camera module as the apparatus travels along the inside of the pipe and without the heater or blower in operation. The reference image data is stored in a memory for processing. Location information is optionally assigned to the data of each reference image. The apparatus travels along the same length of pipe and captures images at the same or similar locations along the pipe but this time with the heater and blower operational to heat the gas. The on-surface controller, e.g. a computer configured to execute a computer program, receives raw image data corresponding to each captured image of the pipe wall or pipe fitting or the like and compares the captured image data with the respective reference image data corresponding to substantially the same location along the pipe. The computer program executable on the computer is configured to compare captured unheated images with the closest corresponding heated images, e.g. each captured image is effectively 'overlaid' with respect to the reference image. A basic analysis looks for overall changes in temperature of features to determine whether or not a leak is occurring at the location in the pipe corresponding to that particular image.

To filter out unwanted 'noise' from the images, feature contrasts are calculated and filters can be applied to the images to select only changes that are within the contrast thresholds of features that are likely to be leakage on the pipeline wall, e.g particles on the inner surfaces will also heat up and will be observable. These are removed with the contrast filter as the edges of these features have higher contrast than a temperature gradient presented by a typical leak due to heat transfer from the leak into the pipe wall presenting a lower contrast.

The apparatus aptly comprises a location tracking device, such as a global positioning system (GPS), magnetic flux system or an acoustic meterage using bi-directional time of flight to calculate distance travelled and in-pipe flow conditions, for determining a position of the apparatus along the pipe and associating each reference image and each captured image with location coordinates or the like.

Figure 4:
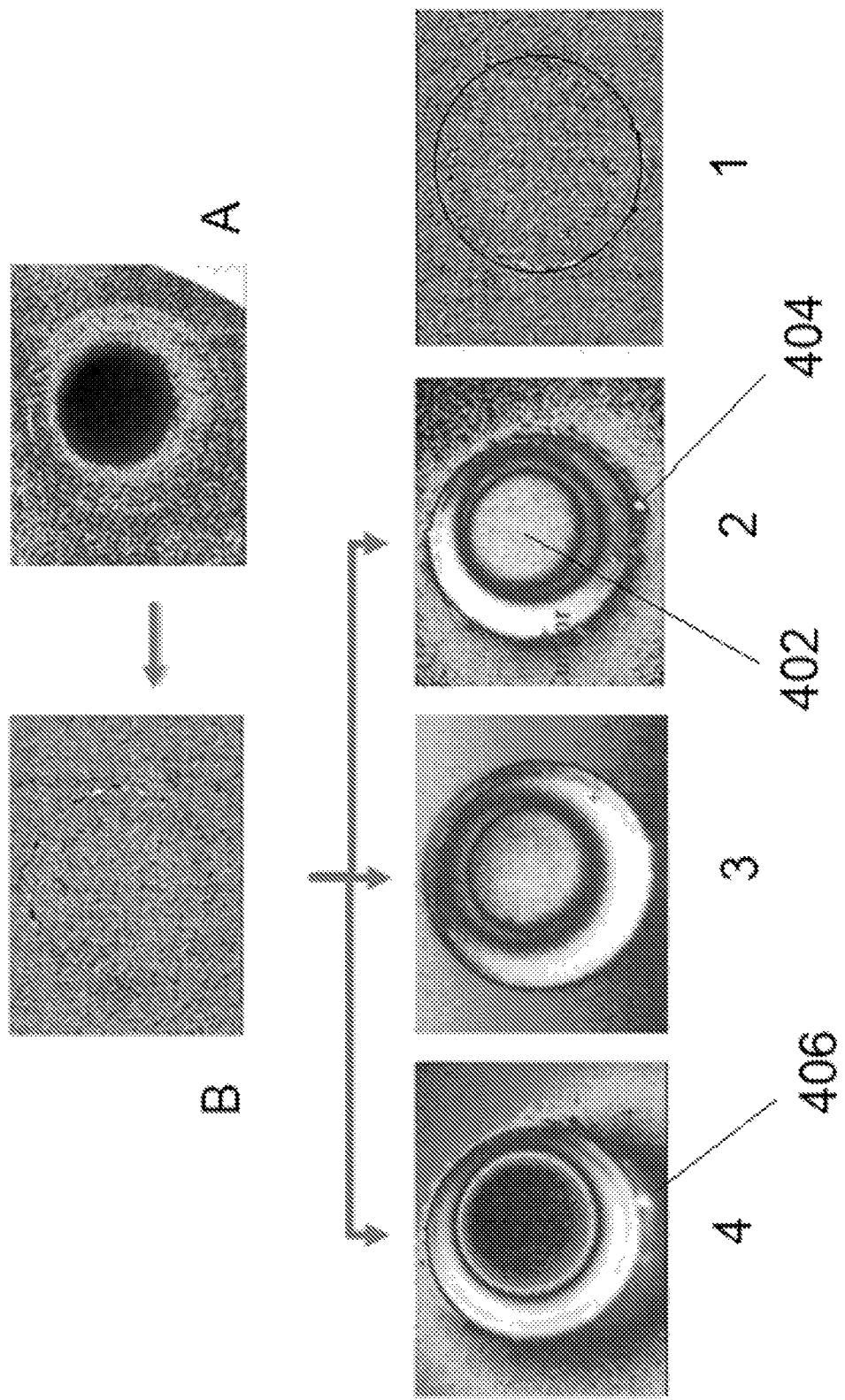
FIG. 4 illustrates images captured by the apparatus according to certain embodiments of the present invention.

As an example, as illustrated in FIG. 4, an image (referenced A) is captured by the apparatus of a section of gas pipe at a known location along the pipe and without power being supplied to the heater element, i.e. no heating of the gas flowing through the pipe. Raw image data is captured every X units of distance travelled along the pipe and forms a series of baseline/reference images, as referenced B. Computations are performed on the reference images to categorise the levels of temperature variation at baseline conditions throughout the pipeline section. ROIs (regions of interest) can be selected on the images and the computer calculates the baseline image brightness distribution and the contrast distribution for the image or selected ROIs. These measurements form baseline values for the section of the pipe.

Images of the pipe wall are then captured as the apparatus is moved along the inside of the pipe again but this time with the heater powered to thereby create a heated stream of gas within the pipe. The captured image data is received by the controller either directly from the camera module or from a memory for storing the captured images, and is processed to compare the captured image data at a particular location along the pipe with the closest reference image data corresponding to that location. The heated image or image ROIs are calculated for brightness (temperature) distributions and contrast distributions. The captured images are processed in the same way to the unheated images. Contrast filtering can be applied to remove noise from internal debris and particles and focus the results on features that have the expected spatial temperature gradient (contrast) that is proportional to the pipe material heat transfer properties. The baseline and heated results are then compared and the differences are used to infer that leakage is present at that location/ROI.

Result interpolation can be used where there is not an exact match between the locations of 'baseline' (reference) and 'heated' (captured) image data. Where there may be 'sensor drift' for the location recording, the controller, e.g. a computer, can cross-correlate the CCTV images that are taken alongside the thermal images to select the baseline and heated images that align the closest for that particular location.

A gradient or contrast filter algorithm is applied to differentiate between internal surface contamination and features that are heated by the gas. These features generally have a higher temperature gradient as they are less conductive and are discontinuous to the pipe body. Leakage through the pipe wall has an increased gradient as the heat can flow therefore having low contrast edges. The rate of gradient is measured to infer information about the pipe material and condition as well as the leakage rate.

Particle and threshold filtering is used to improve the definition and isolate potential leakages. The detected and categorised leak images are stored to train the processor, i.e. a computer program executable on a computing device, to detect the leakages automatically. The thermal images used to train the processor contain other data including acoustic, temperature, pressure and flow data.

For a more detailed analysis the apparatus stays stationary at a location of interest. A baseline unheated image is captured. The heater is then activated and the IR camera and sensors, such as for determining gas temperature, flow rate, pipe material etc., capture data throughout a static heating and cooling cycle. The detailed analysis is then able to calculate the rates of change of contrast and temperature at that location or ROI of the feature. This increased information over absolute forms information that can more precisely indicate the leakage rate. This more detailed image processing according to certain embodiments of the present invention includes the following steps to additionally determine the scale of a leak:

Determination of the pipe bulk flow rate and temperature at leakage location;
Determination of thermal conductivity of the pipe/feature material;
Determination of the defect (leak) geometry;
Determination of the gas pressure; and
Determination of the rates of change of feature temperature and contrast.

The bulk flow rate can either be measured by the apparatus directly or can be determined from the rate of change of the bulk flow temperature measured by temperature sensors provided on the apparatus. The bulk temperature at the leakage location can either be directly measured by temperature sensors or can be calculated from the heater output temperature, bulk flow rate of the gas, the pipeline size and the distance from the heater using an energy conservation gas temperature correlation equation.

The pipe and feature material thermal properties are known and documented for the materials commonly used. The leak geometry is determined through image analysis. The captured (heated) images are analysed. The first 'heated' images to include heated gas creates features that more closely show the defect geometry, before thermal conductivity through the material surrounding the defect shows a heated region around the feature. Additionally, later 'heated' images show a larger heated region that can be processed to create a distance map from the "edges" back to a common set of central points that represent the defect geometry. By known pipe size and camera positioning (or through laser points/3D scans), the defect sizes and shapes can be accurately determined.

The gas pressure is measured by pressure sensors. The rates of change of feature temperature and contrast are calculated between the images, such as the frames from videos of the heating process with the thermal camera.

The profiles of the rates of change in temperature of the pixels within the images and the features/ROIs are measured. Measurements of the absolute temperature, temperature lag/phase response, rate of increase, rate of cooling, and any frequency variation of pixels/features are taken and saved. Curves are fitted to the results from the measurements taken to generate additional rate change parameters.

Filters are applied in a similar way to remove high and low contrast elements that do not correlate to the intended materials.

The values calculated are run through conservation and transfer of energy equations to calculate the proportional leakage rate through the feature that would cause the observed temperature rise for the conditions measured. This is then saved into the dataset.

Multiple visits to the location can be conducted to build up a dataset that shows the change in leakage over time.

As some of the leaking gas passes through a crack or loose joint, for example, it expands and its pressure decreases. In turn, its temperature also typically decreases through the Joule Thompson effect. However, the relatively warm heated gas increases the surface temperature of the pipe or fitting locally where the leak is occurring to thereby create a temperature gradient/difference between the heated gas and the cooler main body of the gas and/or the local pipe surface where the leak is occurring and the main body of the pipe where no leak is occurring. The scale of the active heating of the pipe or fitting proximal the leak location is typically larger than the cooling or heating through this Joule Thompson effect whether the leaking gas causes a passive heating (hydrogen) or cooling (natural gas). The induced temperature gradient of the pipe or fitting proximal the leak location by gas heating is detectable by the IR camera module and comparable with the reference image data to accurately determine the occurrence and location of the leak irrespective of the Joule Thompson effects alone.

The apparatus can also determine whether connections to the pipeline are consuming gas. The image referenced 1 in FIG. 4 illustrates a captured image wherein no leakage or consumption is present though a service connection/offtake. The image referenced 2 in FIG. 4 illustrates a captured image wherein both leakage and consumption are present. The relatively bright central area 402 indicates the gas flow through the pipe (consumption/supply) and the relatively bright localised area/s 404 at the bottom of the image indicate a leak through a joint in view of the excited and heated gas stream exiting through the leaking joint and warming the surface local to the leak relative to the cooler surfaces of the pipe distal to the leak. The image referenced 3 in FIG. 4 illustrates a captured image wherein consumption but no leakage is present. The image referenced 4 in FIG. 4 illustrates a captured image wherein leakage but no consumption is present, as indicated by the relatively bright localised area 406 near the bottom of the image.

Figure 5:
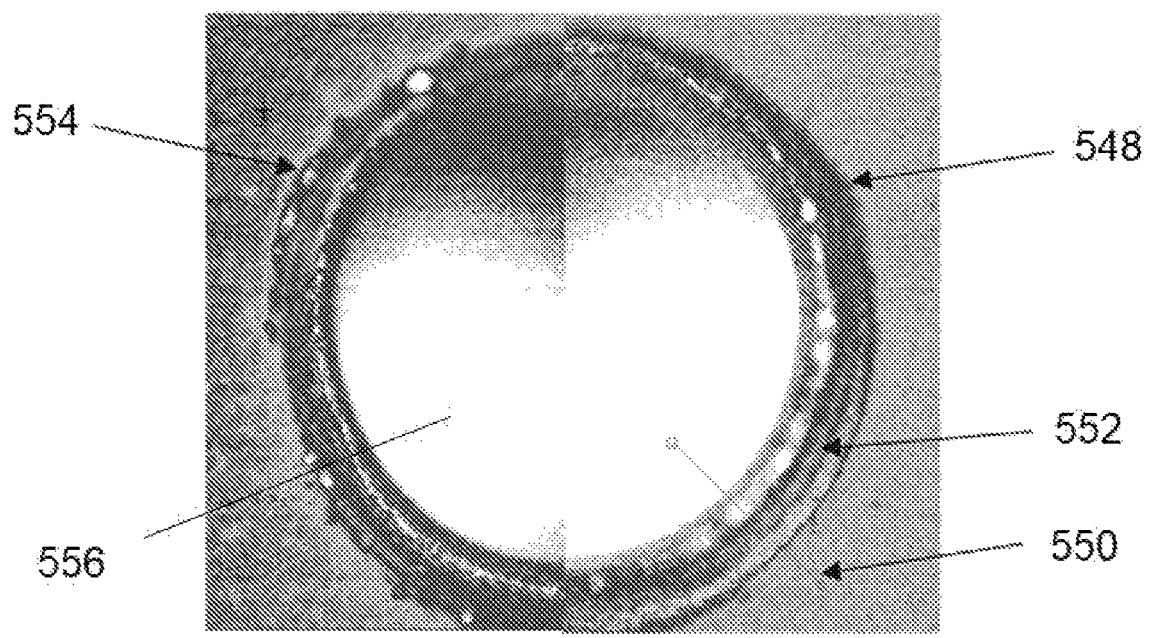
FIG. 5 illustrates a stitched image of a leaking pipe interface vs a non-leaking pipe interface.

FIG. 5 illustrates two halves of different captured images stitched together. As shown on the right-hand side of the image, the peripheral interface 548 between the pipe wall 550 and the fitting 552 is relatively defined by a dark line indicating no leakage is occurring at the joint. However, as shown on the left-hand side of the image, the upper left portion of the joint region includes a plurality of relatively bright localised areas 554 and is less defined indicating a leak is occurring across the joint. The relatively bright central area 556 in each image indicates gas is flowing through the service pipe (consumption) in view of some of the heated/excited gas stream mixing with the main gas flow and being detected by the IR camera.

The base reference image data may be selected from a database of stored reference data based on a known or particular type of pipeline. The process may be automated by configuring the controller to automatically process each captured image with the selected or predetermined base reference image data. The controller may be configured to provide a visual and/or audible indication when a leak has been detected.

An alternative embodiment of the present invention involves detecting a leak location from inside a pipeline by comparing a temperature of the surface of the pipe or fitting proximal to a leak against a temperature of the surface of the pipe distal to the leak. As the gas passes through a crack or leaking joint, its volume increases and its temperature typically decreases but can increase (e.g. hydrogen). This typical decrease in temperature has a cooling effect on the pipe surface proximal to the leak and the temperature difference between the proximal and distal surfaces relative to the leak can be detected and used to accurately determine the occurrence and location of the leak. This method does not require heating of at least some of the gas flowing through the pipe and may be called a 'passive' leak detection method when compared to the 'active' leak detection method described above which involves heating and exciting the gas proximal to a leak location.

The method of detecting a leak in accordance with certain embodiments of the present invention may be performed by the apparatus as illustrated and described herein, or by a differently conformed yet suitably configured apparatus such as a downhole tool or pigging device which may not include a plurality of wheels for example and which may be pushed along the pipeline by a pushrod or the like or lowered under the influence of gravity downhole on a wireline or the like. The words 'pipeline' and 'pipe' shall be understood to include a single length of pipe or conduit of a plurality of pipe sections connected together to form an underground or over-ground pipeline or downhole wellbore or the like, including any fittings or service lines extending from the main pipeline. The pipeline may form ducting in a building or an underground tunnel or the like for conveying a fluid or a waste water system. The pipeline may have any suitable cross section such as circular, square or the like.

The captured data can be referenced and be later processed through machine learning and Artificial Intelligence algorithms to identify likely conditions of leakage. These conditions can then be searched and prioritised for replacement of repair activities. The information captured can be used as evidence of the suitability of the pipelines for the carrying of fluids therein. The detection can be used in a variety of pipes including gas, drainage, process, nuclear and sewers. The baselined data can include other measurements used alongside the leak detection. These can include acoustic measurements, thermal, pressure and radiation to detect increased levels of radon that has accumulated at the leaking joint. The baselines can be captured at time intervals to determine changes within the pipelines or features over time.

Certain embodiments of the present invention therefore provide a method and apparatus for efficiently determining a leak location of a fluid in a pipeline, such as a gas, and accurately confirming the location of the leak from within the pipe itself. If the fluid (gas or liquid) in the pipeline has a region of transmission in the IR range, the fluid can be used to determine the leak location in accordance with certain embodiments of the present invention. The method is non-destructive and eliminates the need for disruptive and inaccurate bar holing or other forms of extensive excavation. Once the location and nature of a leak has been accurately determined, a single excavation can be carried out to repair the leak from outside the pipe, if required. Alternatively, repair apparatus may be sent down the pipeline to repair the leak from within the pipe to eliminate the need to excavate at all. A method and apparatus according to certain embodiments of the present invention is particularly compatible with future hydrogen networks and is not reliant on detecting a pressure drop across the pipeline wall.

The invention claimed is:

1. A method of determining a leak location in a pipeline, comprising:
    processing captured image data associated with at least one image captured from within a pipeline to identify a change in temperature of an interior surface of the pipeline responsive to a change in temperature of a fluid leaking from the pipeline to determine a leak location in the pipeline;
    capturing the at least one image at a first location along the pipeline; and
    comparing the captured image data with reference image data associated with a corresponding reference image obtained at a location within the pipeline substantially corresponding to the first location.

2. The method according to claim 1, comprising comparing at least one pixel of the captured image with at least one corresponding pixel of the reference image to identify the change in temperature of the interior surface of the pipeline proximal to the leak location.

3. The method according to claim 2, comprising comparing pixel intensity/brightness and/or contrast distribution associated with corresponding pixels of the captured image and the reference image.

4. The method according to claim 3, comprising categorising the reference image data of a plurality of reference images obtained at different locations along the pipeline based on pixel intensity/brightness variation.

5. The method according to claim 3, comprising creating contrast thresholds based on pixel contrast distributions for a plurality of reference images obtained at different locations along the pipeline, and applying a contrast filter based on the contrast thresholds to the captured image data of the corresponding captured images.

6. The method according to claim 1, wherein the temperature of the interior surface of the pipeline proximal to the leak location is less than the temperature of a main body of fluid flowing along the pipeline and/or the temperature of the interior surface of the pipeline distal to the leak location.

7. The method according to claim 1, wherein the temperature of the interior surface of the pipeline proximal to the leak location is greater than the temperature of a main body of fluid flowing along the pipeline and/or the temperature of the interior surface of the pipeline distal to the leak location.

8. The method according to claim 7, wherein a temperature of the leaking fluid increases at the leak location responsive to an increase in volume of the leaking fluid to thereby increase the temperature of the interior surface of the pipeline proximal to the leak location.

9. The method according to claim 7, comprising actively heating a portion of the fluid flowing along the pipeline.

10. The method according to claim 9, comprising determining a rate of change of temperature of the interior surface of the pipeline proximal to the leak location.

11. The method according to claim 10, comprising determining a leakage flow rate at the leak location based on the rate of change of temperature and one or more of the following data: bulk fluid temperature, bulk fluid flow rate, bulk fluid pressure, surface temperature, surface lag/phase response, rate of surface temperature increase, rate of surface temperature cooling, pipeline material thermal properties, leak location and leak geometry/size.

12. The method according to claim 11, comprising intermittently actively heating a portion of the fluid flowing along the pipeline and capturing said image data and one or more of the additional data during heating and cooling of the interior surface of the pipeline proximal to the leak location.

13. The method according to claim 9, comprising blowing at least a portion of the actively heated fluid along the pipeline or radially outwardly with respect to a longitudinal axis of the pipeline, and optionally heating said portion of fluid by at least one heating element of apparatus located in the pipeline.

14. A system for determining a leak location in a pipeline, comprising:
   apparatus for locating in a pipeline and comprising a device for capturing images of an interior surface of the pipeline;
   a controller configured to process captured image data associated with at least one image captured from within the pipeline to identify a change in temperature of the interior surface of the pipeline responsive to a change in temperature of a fluid leaking from the pipeline to determine a leak location in the pipeline; and
   a heater for heating a portion of the fluid flowing along the pipeline.

15. The system according to claim 14, wherein the apparatus comprises a blower for blowing the portion of the fluid along the pipeline or radially outwardly with respect to a longitudinal axis of the pipeline.

16. Apparatus for determining a leak location in a pipeline, comprising:
   a body for controllably moving along an interior of a pipeline;
   an image capturing device mounted to the body for capturing images of an interior surface of the pipeline; and
   a heater for actively heating a portion of fluid flowing along the pipeline.

17. The apparatus according to claim 16, comprising a blower for blowing a portion of the fluid along the pipeline or radially outwardly with respect to a longitudinal axis of the pipeline, wherein the blower is optionally configured to blow the portion of fluid over a heating element of the heater.

18. The apparatus according to claim 16, comprising a controller configured to process captured image data associated with at least one image captured from within the pipeline to identify a change in temperature of the interior surface of the pipeline responsive to a change in temperature of a fluid leaking from the pipeline to determine a leak location in the pipeline.

* * * * *